United States Patent
Bergman et al.

(10) Patent No.: US 8,345,974 B2
(45) Date of Patent: Jan. 1, 2013

(54) HIERARCHICAL RECURSIVE IMAGE SEGMENTATION

(75) Inventors: Ruth Bergman, Haifa (IL); Sandeep N Bhatt, Madison, NJ (US); Renato Keshet, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 816 days.

(21) Appl. No.: 12/502,675

(22) Filed: Jul. 14, 2009

(65) Prior Publication Data

US 2011/0013837 A1 Jan. 20, 2011

(51) Int. Cl.
G06K 9/34 (2006.01)
(52) U.S. Cl. .................................................... 382/173
(58) Field of Classification Search ........... 382/173–176
See application file for complete search history.

(56) References Cited

U.S. PATENT DOCUMENTS

| | | | |
|---|---|---|---|
| 2003/0149698 A1* | 8/2003 | Hoggatt ...................... | 707/100 |
| 2003/0224344 A1* | 12/2003 | Shamir et al. ............... | 435/4 |
| 2007/0047810 A1* | 3/2007 | Grady ........................ | 382/173 |
| 2007/0058865 A1* | 3/2007 | Li et al. ..................... | 382/173 |
| 2007/0211938 A1* | 9/2007 | Tu et al. .................... | 382/170 |
| 2008/0247646 A1* | 10/2008 | Chefd'hotel et al. ....... | 382/173 |
| 2009/0028433 A1* | 1/2009 | Tolliver et al. ............. | 382/173 |
| 2009/0136103 A1* | 5/2009 | Sonka et al. ............... | 382/128 |
| 2010/0008576 A1* | 1/2010 | Piramuthu ................. | 382/173 |
| 2010/0232686 A1* | 9/2010 | Dewan et al. .............. | 382/159 |
| 2010/0310146 A1* | 12/2010 | Higgins et al. ............. | 382/131 |
| 2011/0211771 A1* | 9/2011 | Rubenstein et al. ........ | 382/299 |

OTHER PUBLICATIONS

D. Comaniciu and P. Meer. Mean shift: a robust approach toward feature space analysis. Pattern Analysis and Machine Intelligence, IEEE Transactions on, 24(5):603-619, 2002.

E. Diday and J.C. Simon. Clustering analysis. Digital Pattern Recognition, pp. 47-94, 1980.

S. Geman and D. Geman. Stochastic relaxation, gibbs distributions, and the bayesian restoration of images. PAMI, 6:721-741, 1984.

Luis Garcia Ugarriza, Eli Saber, Vincent Amuso, Mark Shaw, and Ranjit Bhskar. Automatic image segmentation by dynamic region growth and multiresolution merging. Journal of Image Processing, 99(99), 2009.

Martinez Bailac. Semantic retrieval of memory color content. PhD thesis, Universitat Autonoma de Barcelona, 2004.

C. Pantofaru and M. Herbert. A comparison of image segmentation algorithms. Technical Report CMU-RI-TR-05-40, The Robotics Institute, Carnegie Mellon University, 2005.

R. Bergman, H. Nachlieli, and G. Ruckenstein. Perceptual segmentation: per-face skin map, eye location, body skin map and sky map. Technical Report HPL-2007-135, HP, 2007.

Jianbo Shi and JitendraMalik. Normalized cuts and image segmentation. IEEE Transactions on Pattern Analysis and Machine Intelligence, 22:888-905, 2000.

W. Tao, H. Jin, and Y. Zhang. Color image segmentation based on mean shift and normalized cuts. Systems, Man, and Cybernetics, Part B, IEEE Transactions on, 35(5):1382-1389, 2007.

(Continued)

*Primary Examiner* — Jingge Wu (57) ABSTRACT

An image is segmented into image regions. Each of the image regions is represented by a respective vertex. A graph of the vertices interconnected by edges, each of which has a respective edge weight value, is built. The graph is partitioned into respective disjoint subgraphs based on the edge weight values. The partitioning of one or more of the subgraphs into respective subgraphs is repeated. A partition tree data structure that describes a partitioning hierarchy of parent-child relationships between the subgraphs is produced.

20 Claims, 7 Drawing Sheets

OTHER PUBLICATIONS

D. Tolliver and G. Miller. Graph partitioning by spectral rounding: applications in image segmentation and clustering. In International Computer Society Conference on Computer Vision and Pattern Recognition, vol. 1, pp. 1053-1060, 2006.

David Tolliver. Spectral rounding and image segmentation. PhD thesis, Carnegie Mellon University, 2006.

Ranjith Unnikrishnan, Caroline Pantofaru, and Martial Hebert. A measure for objective evaluation of image segmentation algorithms. In Proceedings of the 2005 IEEE Conference on Computer Vision and Pattern Recognition (CVPR '05), Workshop on Empirical Evaluation Methods in Computer Vision, vol. 3, pp. 34-41, Jun. 2005.

R. Unnikrishnan and M. Herbert. Measures of similarity. In IEEE Workshop on Computer Vision Applications, pp. 394-400, 2005.

O. Veksler. Image segmentation by nested cuts. Computer Vision and Pattern Recognition, pp. 339-344, 2000.

D. Verma and M. Melia. A comparison of spectral clustering algorithms. Technical Report Mar. 5, 2001, University of Washington, 2003.

W. Yang, L. Guo, T. Zhao, and Guchu Xiao. Improving watersheds image segmentation method with graph theory. In Industrial Electronics and Applications, 2007. ICIEA 2007. 2nd IEEE Conference on, pp. 2550-2553, 2007.

S.C. Zhu, T.S. Lee, and A. Yuille. Region competition: unifying snakes, region growing and mdl for image segmentation. ICCV, 24:416-425, 1995.

T.F. Chan and L.A. Vese. Active contours without edges. Image Processing, 10(2):266-277, 2001.

M. Kass, A. Witkin, and D. Terzopoulos. Snakes: Active contour models. IJCV, 1(8):321-331, 1987.

D. Martin, C. Fowlkes, D. Tal, and J. Malik. A database of human segmented natural images and its application to evaluating segmentation algorithms and measuring ecological statistics. In Proc. 8th Int'l Conf. Computer Vision, vol. 2, pp. 416-423, Jul. 2001.

R. Bergman, H. Nachlieli, and G. Ruckenstein. Detection of textured areas in natural images using an indicator based on component counts. accepted to Journal of Electronic Imaging, 2009.

Lee Vincent and Pierre Soille. Watersheds in digital spaces: An efficient algorithm based on immersion simulations. IEEE PAMI, 1991, 13(6):583-598, 1991.

Thomas Hofmann, Jan Puzicha, and JoachimM. Buhmann. Unsupervised texture segmentation in a deterministic annealing framework. IEEE Transactions on Pattern Analysis and Machine Intelligence, 20(8):803-818, 1998.

* cited by examiner

HIERARCHICAL RECURSIVE IMAGE SEGMENTATION

BACKGROUND

Image segmentation typically involves separating object regions of an image from background regions of the image. Many different approaches for segmenting an image have been proposed, including thresholding, region growing, and watershed transform based image segmentation processes. The segmentation results of such processes may be used for a wide variety of different applications, including object extraction for object description, object detection, object recognition, and object tracking. In general, for each such vision task, the "correct" image segmentation is different. For example, a coarse skin color map may suffice as a first step for face detection, whereas for face recognition every element of the face must be segmented. As a result, many existing techniques require considerable manual intervention, with users required to tune parameters per image to obtain good segmentations.

What are needed are apparatus and methods that are capable of automatically segmenting images for different applications in ways that require minimal manual intervention.

SUMMARY

In one aspect, the invention features a method in accordance with which an image is segmented into image regions. Each of the image regions is represented by a respective vertex. A graph of the vertices interconnected by edges, each of which has a respective edge weight value, is built. The graph is partitioned into respective disjoint subgraphs based on the edge weight values. The partitioning of one or more of the subgraphs into respective subgraphs is repeated. A partition tree data structure that describes a partitioning hierarchy of parent-child relationships between the subgraphs is produced.

The invention also features apparatus operable to implement the method described above and computer-readable media storing computer-readable instructions causing a computer to implement the method described above.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

I. DEFINITION OF TERMS

The term pixel" refers to an addressable region of an image. Each pixel has at least one respective value that is represented by one or more bits. For example, a pixel in the RGB color space includes a respective value for each of the colors red, green, and blue, where each of the values may be represented by one or more bits.

A "computer" is a machine that processes data according to machine-readable instructions (e.g., software) that are stored on a machine-readable medium either temporarily or permanently. A set of such instructions that performs a particular task is referred to as a program or software program.

The term "machine-readable medium" refers to any medium capable carrying information that is readable by a machine (e.g., a computer). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

A "predicate" is a conditional part of a rule. A "termination predicate" is a predicate that conditions a termination event on satisfaction of one or more criteria.

As used herein, the term "includes" means includes but not limited to, the term "including" means including but not limited to. The term "based on" means based at least in part on.

II. INTRODUCTION

The embodiments that are described herein provide apparatus and methods that are capable of automatically segmenting images for different applications in ways that require minimal or no manual intervention. These embodiments are tunable for different applications by respective sets of parameters and termination predicates (also referred to herein as "stopping conditions"). This allows these embodiments to be readily adaptable to different applications with minimal or no manual intervention. Once an embodiment is tuned for a particular application, the segmentation of image for the particular application typically is fully automatic.

III. OVERVIEW

Figure 1:
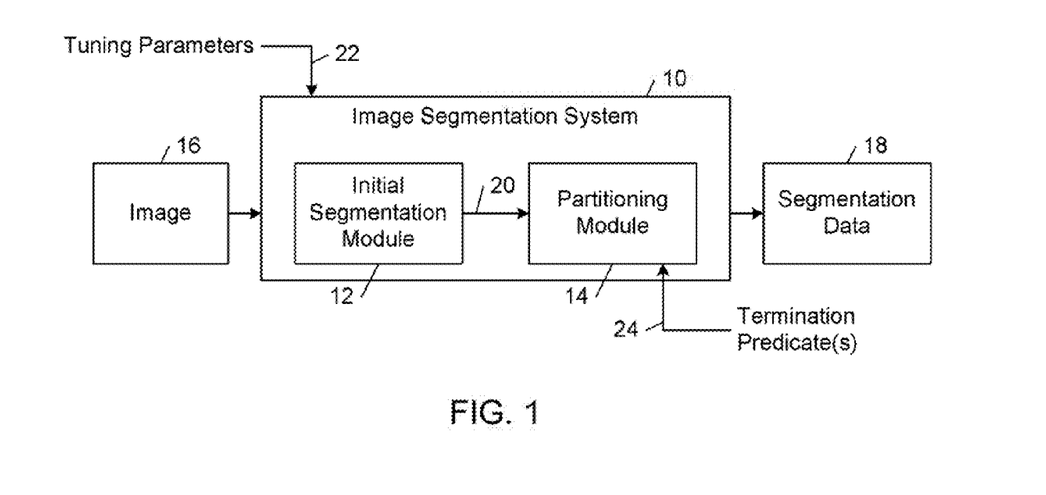
FIG. 1 is a block diagram of an embodiment of an image segmentation system.

FIG. 1 shows an embodiment of an image segmentation system 10 that includes an initial segmentation module 12 and a partitioning module 14. In operation, the image segmentation system 10 processes an image 16 to produce segmentation data 18. In operation, the initial segmentation module 12 determines an initial segmentation of the image 16, builds a graph representation of the initial segmentation, and passes the graph representation 20 to the partitioning module 14. The partitioning module 14 recursively partitions the graph using spectral graph techniques to create a final segmentation, which is described by the segmentation data 18. Both the initial segmentation and the recursive segmentation processes are influenced by respective sets of tuning parameters 22 that can be tailored for different application tasks. In addition, one or more termination predicates 24 are specified to control when the recursive segmentation process terminates and thereby achieve a desired level of segmentation of the image in the final segmentation. In this way, the image segmentation system 10 can be readily adapted to specific computer vision tasks.

The image 16 may be a complete or a partial version of any type of digital or electronic image, including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image.

The segmentation data 18 typically is in the form of a data structure that describes a segmentation of the image into regions. In some embodiments, the data structure is transformed into a graphical representation of a segmentation map, which may be output to a user on a display screen. In some embodiments, the data structure is passed to a downstream application, which uses the data structure in performing a particular computer vision task (e.g., object detection, object extraction, object recognition, object tracking, or interactive tasks such as removing an object from an image).

The image segmentation system 10 is not limited to any particular hardware or software configuration, but rather it may be implemented in any computing or processing environment, including in digital electronic circuitry or in computer hardware, firmware, device driver, or software. For example, in some implementations, image segmentation system 10 may be embedded in the hardware of any one of a wide variety of digital and analog electronic devices, including desktop and workstation computers, digital still image cameras, digital video cameras, printers, scanners, and portable electronic devices (e.g., mobile phones, laptop and notebook computers, and personal digital assistants).

Figure 2:
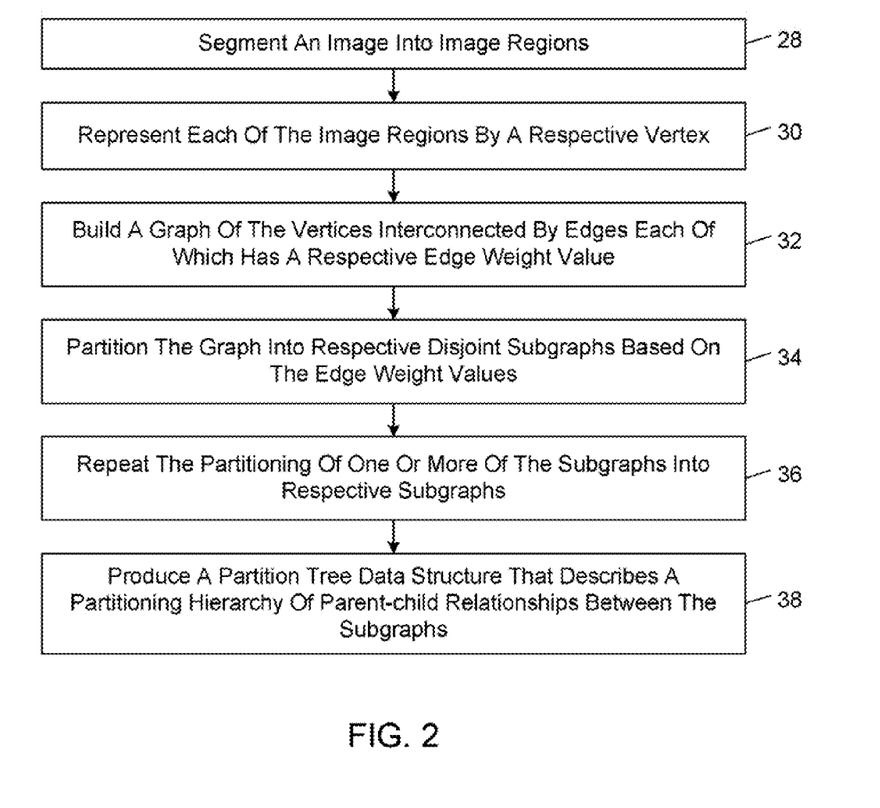
FIG. 2 is a flow diagram of an embodiment of an image segmentation method.
Figure 3:
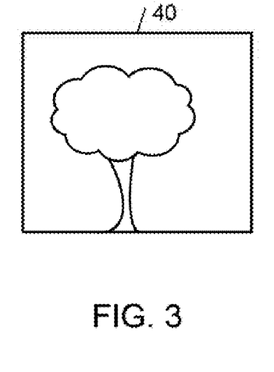
FIG. 3 is a diagrammatic view of an exemplary image.

FIG. 2 shows an embodiment of a method that is implemented by the image segmentation system 10 in the process of generating the segmentation data 18 from the image 16. In accordance with this method, the initial segmentation module 12 segments the image 16 into image regions (FIG. 2, block 28). The initial segmentation module 12 represents each of the image regions by a respective vertex (FIG. 2, block 30) and builds a graph of the vertices interconnected by edges each of which has a respective edge weight value (FIG. 2, block 32). The partitioning module 14 partitions the graph into respective disjoint subgraphs based on the edge weight values (FIG. 2, block 34). The partitioning module 14 repeats the partitioning of one or more of the subgraphs into respective subgraphs (FIG. 2, block 36) and produces a partition tree data structure that describes a partitioning hierarchy of parent-child relationships between the subgraphs (FIG. 2, block 38). The partition tree data structure may be output directly as the segmentation data 18 or it may be processed (e.g., transformed) before being output as the segmentation data 18.

Figure 4:
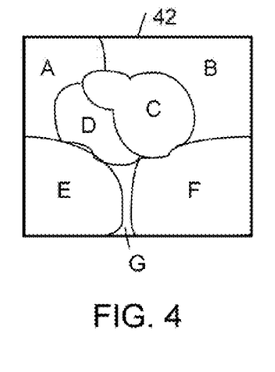
FIG. 4 is a diagrammatic view of an exemplary initial segmentation of the image shown in FIG. 3.
Figure 5:
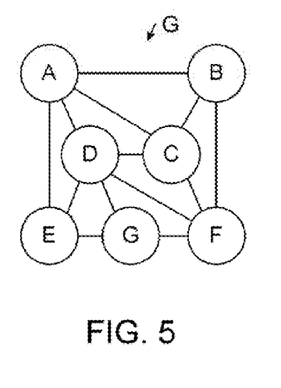
FIG. 5 is a graph representation of the initial segmentation shown in FIG. 4.
Figure 6A:
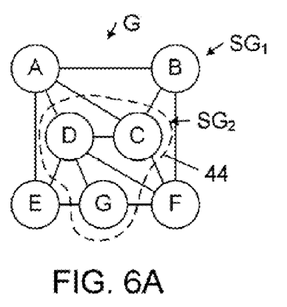
FIG. 6A shows an exemplary partitioning of the graph representation shown in FIG. 5 into first and second subgraphs.
Figure 6B:
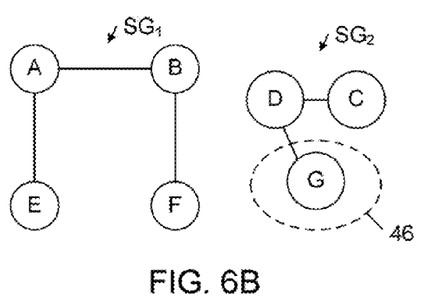
FIG. 6B shows the first and second subgraphs of FIG. 6A and an exemplary partitioning of the second subgraph into third and fourth subgraphs.
Figure 6C:
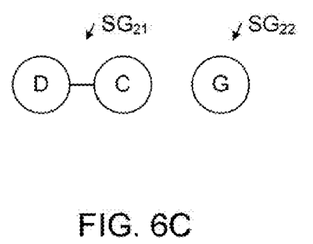
FIG. 6C shows the third and fourth subgraphs of FIG. 6B.
Figure 7:
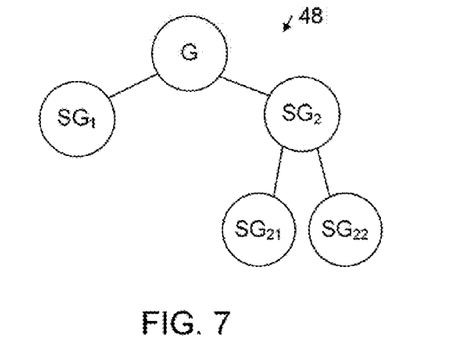
FIG. 7 shows an exemplary partition tree that describes the partitioning hierarchy of parent-child relationships between the subgraphs partitioned from the graph representation of FIG. 5.

FIGS. 3-7 diagrammatically illustrate the hierarchical recursive partitioning of an exemplary image 40. FIG. 4 an exemplary initial segmentation 42 of the image 40 into image regions A-F (FIG. 2, block 28). FIG. 5 shows an exemplary graph G of the initial segmentation 42 (FIG. 2, blocks 30-32). FIG. 6A shows an exemplary partitioning 44 of the graph G into first and second subgraphs $SG_1$ and $SG_2$. FIG. 6B shows the first and second subgraphs $SG_1$ and $SG_2$ and an exemplary partitioning 46 of the second subgraph into third and fourth subgraphs $SG_{21}$ and $SG_{22}$. FIG. 6C shows the third and fourth subgraphs $SG_{21}$ and $SG_{22}$. FIG. 7 shows an exemplary partition tree 48 that describes the partitioning hierarchy of parent-child relationships between the subgraphs $SG_1$, $SG_2$, $SG_{21}$, and $SG_{22}$ that were partitioned from the graph G shown in FIG. 5.

In the illustrated embodiments, the initial segmentation module 12 executes a bottom-up segmentation method (e.g., a clustering or region growing method) to determine the initial segmentation (also referred to herein as the "over-segmentation"). Typically, the tuning parameters for the initial segmentation module 12 are set extremely conservatively so that there is a high probability that each of the segmented image regions in the initial segmentation belongs to no more than one object of the image 16. In the graph representation of the initial segmentation that is constructed by the initial segmentation module 12, each vertex (also referred to herein as a "node") represents a set of pixels that comprises a contiguous region in the image 16 that typically belongs to one object in the image 16.

In the illustrated embodiments, after the graph has been created, the partitioning module 14 recursively partitions the vertices into two subsets at each step. The recursive partitioning process can be terminated at any point, with the recursion varying in depth in different parts of the recursion tree. By varying the termination condition, the segmentation process can be tailored for each application. In implementations in which the recursive partitioning continues to completion, a useful ordering of the image regions in the initial segmentation is produced. For example, it has been observed that segments that are near each other in this ordering are related perceptually (with the exception of the two leaves that were split in the very first partition, and are right next to each other in the ordering).

The modeling of each vertex as an image region instead of an individual pixel improves the segmentation performance of the image segmentation system 10. For example, the region-based modeling significantly reduces the dimensionality of the partitioning process performed by the partitioning module 14. This reduces the computational and memory resources needed to determine the final segmentation. In addition, the region-based modeling results in more robust measures of the similarity of two vertices, which improves the image segmentation results by reducing the sensitivity to noise. In particular, the color value of any pixel represents the color of the object and some noise and therefore color differences between individual pixels include a large component of noise. The color difference between, for example, the average values of two regions, removes the noise, thereby giving a more reliable measure of similarity. The region-based modeling of the vertices also is advantageous with respect to texture measures. In particular, texture measures often are computed in a neighborhood around a given pixel, despite the fact that this neighborhood may cross an image edge. In the segmentation process described in detail below, texture features are computed within the regions of the initial segmentation, making the resulting texture measures more robust. Additionally, the region-based modeling allows each region to be characterized by features that are specific to important perceptual objects, such as skin, sky, and foliage.

The elements of the method of FIG. 2 are described in detail below in the following section.

IV. EXEMPLARY EMBODIMENTS OF HIERARCHICAL RECURSIVE SEGMENTATION

A. Overview

This section describes embodiments of the hierarchical recursive image segmentation method implemented by the image segmentation system 10. As explained above, this method combines an initial segmentation of the image 16 that uses a bottom-up segmentation process (e.g., a mean-shift or a watershed segmentation process) and a recursive segmentation approach (e.g., a top-down spectral partitioning process).

In the embodiments illustrated below, a bottom-up segmentation process that over-segments the image 16 into image regions initially is performed; next, a graph that represents the over-segmentation is defined; and a final segmentation is produced by recursively performing a spectral normalized cut (NCut) partitioning process on the graph representation. The segmentation process implemented by some of these embodiments is summarized as follows:

1. Apply either the mean-shift or watershed algorithm to produce an over-segmentation.
2. Represent each segment in the over-segmentation from Step 1 by a vertex, and define a weighted graph G on the set of vertices. Specifically, if the physical distance between two segments is a specified amount (e.g., 50%-75%, and preferably 66.7%) less than the side length of the image, then add a weighted edge between the corresponding vertices.
3. Apply the NCut algorithm to the graph to partition the vertices into two sets, or segments.
   (a) Check whether this partition should be accepted. If so, recursively apply the NCut algorithm on the subgraph. Otherwise, mark the vertex set as "complete."
4. Finally, iterate over all the vertex sets marked "complete" and label all the pixels lying within the corresponding regions with a common, unique, label.

In this process, the initial over-segmentation partitions the image 16 into regions, each of which is represented by a vertex in a graph representation. A partition tree is produced, where the root of the partition tree is the original graph, and each node of the tree is a subgraph. The leaves of the tree (where the partitioning stops) are the final segmentation. Each of the leaves is assigned a unique label. All vertices in a leaf subgraph get the same label. This label is the path from the root to the leaf, where the names of the nodes along the path are concatenated. In cases in which an "object" appearing in the image 16 has been split so that parts of the object appear in different leaves, there is expected to be a common ancestor that will contain all pieces of the object.

As a result of the hierarchical partitioning, each image region can be assigned multiple labels, where the last label is the most specific and the first label is the most general possible assignment for that region. Thus, any cut through the hierarchical tree produces a potentially useful segmentation map, where each node in the tree corresponds to a "partial" segmentation that may be important for a particular application. For example, in some applications, a user is allowed to select an object. The object might be divided to several segments, but we expect to find the entire object at some internal node of the binary tree. In some embodiments, the user is provided with an interface that enables him to move up the segmentation tree, which makes selecting the entire object easy.

B. Image Features

Both the initial segmentation of the image 16 and the recursive partitioning of the graph representation of the initial segmentation are performed based on features that are extracted from the image. In general, any type of image features may be used in these segmentation processes.

The illustrated embodiments of the hierarchical recursive image segmentation method typically use one or more color features, texture features, and features that are specific to perceptual objects.

1. Color Features of Pixels

In general, the hierarchical recursive image segmentation method may use any of a wide variety of different color features. In some embodiments, the hierarchical recursive image segmentation method typically use color features in one or more of the CIELAB color space (which separates tones and colors) and the LCH color space (which separates the chroma (C) component from the hue (H)).

2. Texture Features of Pixels

In general, the hierarchical recursive image segmentation method may use any of a wide variety of different texture features (see, e.g., R. Bergman, H. Nachlieli, and G. Ruckenstein, "Detection of textured areas in natural images using an indicator based on component counts," J. Electron. Imaging, Vol. 17, 043003 (October 2008)). Exemplary texture features include textures features that distinguish smooth areas from textured areas and texture features that distinguish between two textures. Examples of the former type of texture feature include standard deviation, gradient magnitude, and gradient direction texture features. Examples of the latter type of texture feature include a gradient correlation measure that computes local gradient directions in the red, green and blue channels, and assesses the correlation between the gradient (see, e.g., R. Bergman, H. Nachlieli, and G. Ruckenstein, "Perceptual segmentation: per-face skin map, eye location, body skin map and sky map," Technical Report HPL-2007-135, HP, 2007) and a color texture measure that uses the entropy of the RGB color distribution of the pixel neighborhood (see, e.g., Luis Garcia Ugarriza, Eli Saber, Vincent Amuso, Mark Shaw, and Ranjit Bhskar, "Automatic image segmentation by dynamic region growth and multiresolution merging," Journal of Image Processing, 99(99), 2009).

3. Perpetual Object Color Features of Pixels

Many important perceptual objects have a specific perceptual color, for example, sky is blue. Each perceptual color translates to a restricted subspace of a particular color space (e.g., the CIELAB color space). In some embodiments, perceptual object colors are modeled as respective subspaces of the CIELAB color space defined by respective multivariate Gaussians with respective means ($\mu_L$, $\mu_A$, $\mu_B$) and respective standard deviations ($\sigma_L$, $\sigma_A$, $\sigma_B$). In some embodiments, the color model also weights each color channel with a respective weight ($W_L$, $W_A$, $W_B$) that represents the relative importance of the L, A and B color channels. The probability that a pixel with color ($X_L$, $X_A$, $X_B$) has a particular perceptual object color (e.g., sky color) is calculated by evaluating equation (1):

$$P(x_L, x_A, x_B) = \frac{1}{\sigma_L \sigma_A \sigma_B (2\pi)^{3/2}} e^{-\lambda} \quad (1)$$

where $\lambda$ is given by:

$$\lambda = \frac{w_L(x_L - \mu_L)^2}{2\sigma_L^2} + \frac{w_A(x_A - \mu_A)^2}{2\sigma_A^2} + \frac{w_B(x_B - \mu_B)^2}{2\sigma_B^2} \quad (2)$$

In other embodiments, the color model of perceptual object colors are defined in the LCH color space instead of the LAB color space. For example, the skin color model is defined in LCH color space with means (181.23, 31.95, 34.22), standard deviations (29.92, 11.17, 7.81), and weights (1, 1, 1). The sky color model is also defined in LCH color space with means (179.21, 32.82, 183.97), standard deviations (30.40, 13.72, 15.73), and weights (1, 0, 1). The grass color model is also defined in LCH color space with means (138.42, 43.64, 87.85), standard deviations (59.43, 19.32, 9.05), and weights (1, 1, 1). These color models have been statistically inferred from a data set of about 400 images. Color models for other perceptual objects (e.g., blue sky, gray sky, snow, forests, and ground) also can be defined in a similar way.

A Gaussian color model is convenient because its description is short and the probability is straightforward to compute. In other embodiments, however, the color models are defined using other formats, including non-parametric formats.

4. Determining Features of Image Regions

In the illustrated embodiments, the hierarchical recursive image segmentation method involves determining features of the image regions from the pixel features that are extracted from the image. In these embodiments, image region features are determined by aggregating the features of their respective constituent pixels. In some of these embodiments, given an image region that consists of a collection of pixels with respective feature values $X_1 \ldots X_n$, the feature of the image region is determined by summarizing the distribution of these feature values by one or more summary descriptors. In general, a summary descriptor for a particular feature corresponds to any measure that summarizes the distribution of corresponding color pixel features, including an average value (e.g., the mean value) of the corresponding pixel feature values, and a descriptor value that measures another mode (e.g., the entropy) of the distribution of the corresponding pixel feature values.

C. Initial Segmentation

As explained above, the initial segmentation module 12 segments the image 16 into image regions (FIG. 2, block 28). In the illustrated embodiments, the initial segmentation module 12 executes a bottom-up segmentation method (e.g., a clustering or region growing method) to determine the initial segmentation (also referred to herein as the "over-segmentation"). In these embodiments, the distance between two image regions i and j typically is defined as the minimum distance (in pixels) between any two pixels on the boundaries of i and j.

1. Mean-Shift Segmentation

The mean-shift segmentation process is a feature-based clustering approach. The basic idea is to use a recursive hill-climbing method to locate the modes, or maxima of density in the feature space, and use these to assign labels to image pixels. The segmentation is controlled by setting parameters that determine spatial resolution (window size) and color resolution. The spatial resolution parameter (r) defines a (2r+1)×(2r+1) spatial search window when computing mean shift. The color resolution parameter defines when similar colors may be clustered together. By varying the spatial resolution and color resolution parameters, the number of segments in the initial segmentation can be varied.

Some exemplary embodiments of the initial segmentation module 12 produce the initial segmentation process in accordance with the mean-shift segmentation process that is used in the Edge Detection and Image Segmentation (EDISON) System (see http://www.caip.rutgers.edu/riul/research/code-.html). In some of these embodiments, the mean-shift segmentation process uses a window size parameter 7 and color resolution 3, if the number of segments is greater than 1000, then a color resolution 5 is used instead.

2. Watershed Segmentation

The watershed segmentation process interprets the gradient image gray levels as altitude information, and computes watershed lines for this topographical interpretation. Water placed on any pixel enclosed by a watershed line then flows downhill to a local minima, and pixels flowing into the same catchment basin (local minima) form the regions for the segmentation. The segmentation is controlled by the initial choice of seeds.

D. Building a Graph Representation of the Initial Segmentation

As explained above, the initial segmentation module 12 represents each of the image regions by a respective vertex (FIG. 2, block 30) and builds a graph of the vertices interconnected by edges each of which has a respective edge weight value (FIG. 2, block 32). In the illustrated embodiments, the edge weights in the normalized cut algorithm depend on the distances between the aggregate feature vectors corresponding to pairs of interconnected image regions.

In some embodiments, the weights of graph edges $e_{ij}$ are determined as follows:

1. First, for each vertex i, compute the feature vector $f_i$ as the average, over all pixels within that segment, of the feature vector of the pixel.
2. For each segment i compute $W_i$, the k×k covariance matrix for covariances between the k features of segment i. Define the matrix $$W = \frac{1}{N} \sum_{i=1}^{N} W_i,$$

where N is the total number of segments.

3. For any pair i,j of segments we compute the Mahalanobis distance between $f_i$ and $f_j$ as $d_{ij}^2 = (f_i - f_j)^T W (f_i - f_j)$.
4. Finally, the weight $\alpha_{ij}$ of the edge (i,j) is defined as $$\alpha_{ij} = e^{\frac{-d_{ij}^2}{\sigma}}$$

where $\sigma$ is a scaling factor as in the normalized cut algorithm.

In these embodiments, the Mahalanobis distance metric is used to measure the distance between a pair of image regions. The Mahalanobis distance measures the dissimilarity between two vectors, $\vec{x}_i$ and $\vec{x}_j$, drawn from the same distribution with the covariance matrix $\Sigma$ as:

$$D^2 = (\vec{x}_i - \vec{x}_j)^T \Sigma^{-1} (\vec{x}_i - \vec{x}_j) \quad (3)$$

If the covariance matrix is the identity matrix, the Mahalanobis distance reduces to the Euclidean distance. In some embodiments, the covariance matrix Σ is approximated as the mean covariance matrix, averaged over the covariance matrices for each segment in the over-segmentation.

E. Partitioning the Initial Segmentation

As explained above, the partitioning module 14 partitions the graph into respective disjoint subgraphs based on the edge weight values (FIG. 2, block 34), repeats the partitioning of one or more of the subgraphs into respective subgraphs (FIG. 2, block 36), and produces a partition tree data structure that describes a partitioning hierarchy of parent-child relationships between the subgraphs (FIG. 2, block 38).

In the illustrated embodiments, the partitioning module 14 partitions the graph in accordance with a normalized cut segmentation process.

1. Normalized Cut Segmentation

In the normalized cut segmentation process, the image is represented as a weighted graph and a normalized cut of the graph is computed. The normalized cut measures both the similarity within cut regions as well as the dissimilarities across regions. Spectral techniques, based on eigenvalues of the underlying graph, approximate the optimal normalized cuts. One advantage of the spectral approach is that it favors producing contiguous segments in the image plane. The normalized cut segmentation process is summarized in the following paragraphs.

For any partition of a graph G(V,E,w) with weighted edges into two sets A and B of nodes, define the quantity Cut(A, B)=$\Sigma_{i \in A, j \in B} \alpha_{ij}$ as the sum of weights $\alpha_{ij}$ (defined above) of all edges that cross the cut, and define the quantity asso(A)= $\Sigma_{i \in A, (i,j) \in E} \alpha_{ij}$. The Normalized Cut NCut(A,B) is defined as:

$$NCut(A, B) = \frac{Cut(A, B)}{asso(A)} + \frac{Cut(A, B)}{asso(B)}. \quad (4)$$

The NCut algorithm proceeds as follows:
1. Construct a graph G(V,E,w) with one node per image pixel, set E of edges and a weight function w: E→R defined below.
2. Let $d_i = \Sigma_j \alpha_{ij}$, and let D be the diagonal matrix with $d_i$ in position (i,j), and let W be the matrix with $(i,j)^{th}$ element equal to $\alpha_{ij}$.
3. Solve the equation (D−W)x=λDx for eigenvectors with the smallest eigenvalues.
4. Use the eigenvector with the second smallest eigenvalue to partition the nodes into two sets: order the nodes according to their value in the eigenvector, for each node in the sorted order compute the normalized cut for the partition defined by nodes with smaller value, and those with larger value. Pick the partition with minimum normalized cut.

Some embodiments use the Matlab code available from http://www.cis.upenn.edu/jshi/software/ to implement the normalized cut partitioning process.

2. Termination Predicates

The termination predicate used in any given implementation depends on the intended application that will use the segmentation data 18. Embodiments of the image segmentation system 10 may use one or more of the following exemplary termination predicates a. Null Termination This termination condition allows the recursion to run to the end. That is, each leaf of the recursion tree is a single region from the input over-segmentation. At that point in the recursion the graph consists of a single node, and has no edges since there are no two nodes that can be connected. With this termination condition, the segmentation map produced at the leaves of the partition tree is the same as the over-segmentation. Although the segmentation itself is not necessarily ideal for most applications, the recursion process accumulates a lot of interesting image analysis, which is represented in the partition tree. This termination conditions enables us to visually assess the cuts. The segment indices produced by recursing to the end produce an ordering on the image regions of the initial segmentation, which provides an insightful image analysis.

b. Heuristic Termination

This termination predicate is an example termination condition which incorporates one or more heuristics that attempt to capture human perception for the image segmentation task.

Figure 8:
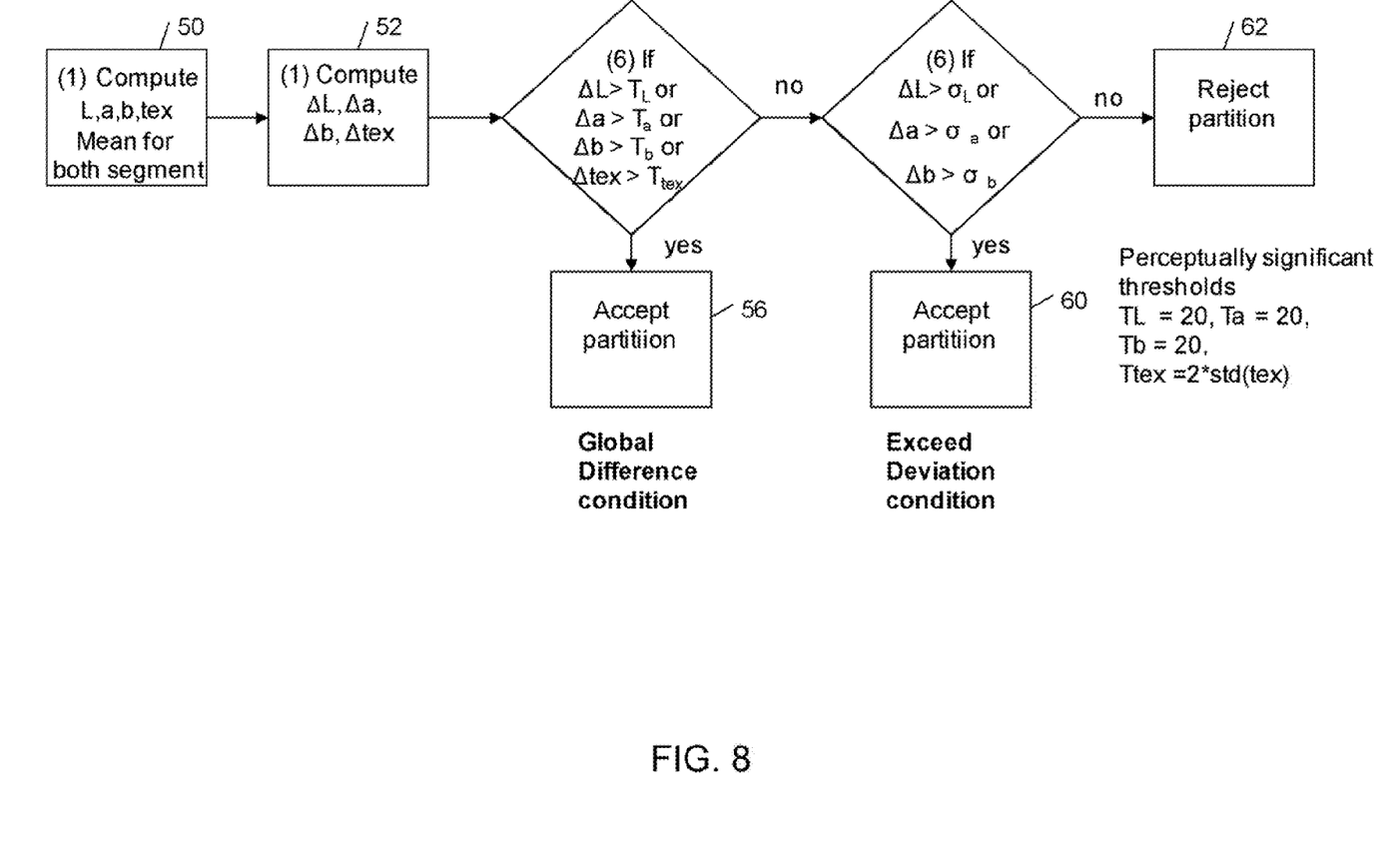
FIG. 8 shows an embodiment of a method of terminating embodiments of the hierarchical recursive segmentation method of FIG. 2.

FIG. 8 shows an embodiment of a method of terminating the hierarchical recursive partitioning in which the termination decision is based primarily on the difference between the two cut regions in the CIELAB color space or in color entropy. The difference is considered significant if it is larger than a constant. For example in some embodiments, twenty levels constitute a significant difference in the CIELAB color space.

In accordance with the method of FIG. 8, for each image region (referred to as a "segment" in FIG. 8) in a pair of image regions the mean of each color channel (e.g., L, A, B) and the mean texture ("tex") is computed (FIG. 8, block 50). The differences between the computed mean values for the two image regions are computed (FIG. 8, block 52). If any of the global difference conditions listed in block 54 are satisfied, the partition is accepted (FIG. 8, block 56); otherwise, if any of the deviation magnitude conditions listed in block 58 are satisfied, the partition is accepted (FIG. 8, block 60); otherwise, the partition is rejected (FIG. 8, block 62). In this embodiment, the parameters $T_L$, $T_a$, $T_b$ are empirically determined perceptually significant threshold values for the differences in the CIELAB color space, the parameter $T_{tex}$ is an empirically determined perceptually significant texture difference threshold value, and the parameters $\sigma_L$, $\sigma_a$, $\sigma_b$ are the standard deviations of the CIELAB color channels for the uncut image region.

Figure 9:
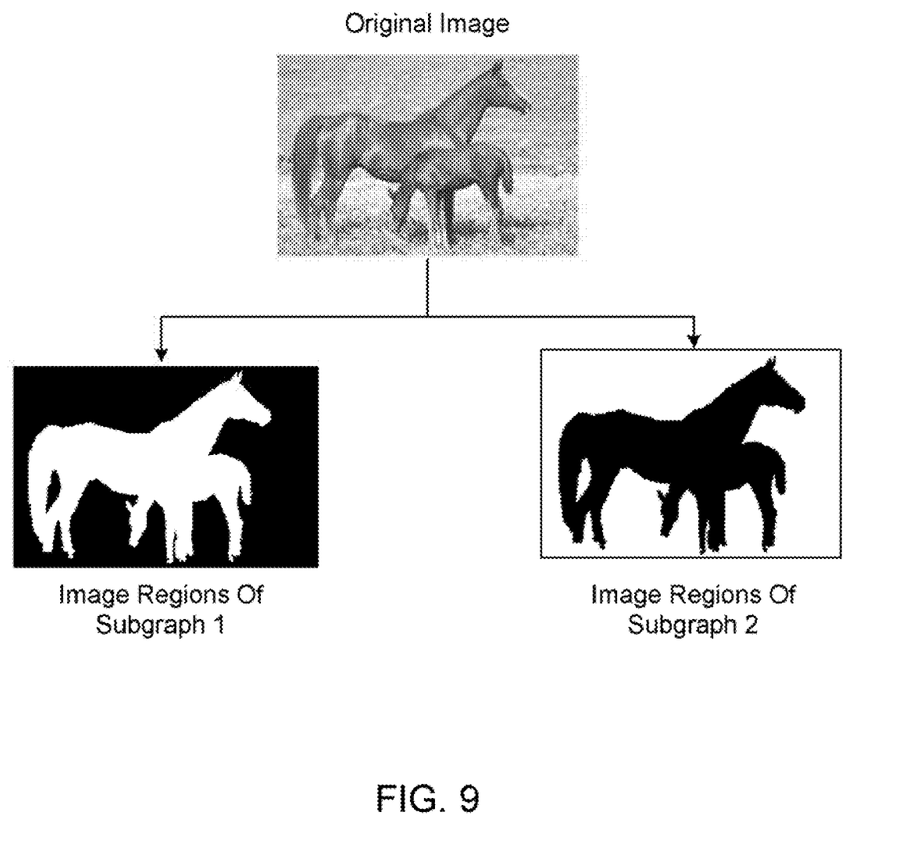
FIG. 9 shows an exemplary segmentation of one partition of an image that is accepted by the termination method of FIG. 8.

An exemplary segmentation map of one partition that is accepted by the termination method of FIG. 8 is illustrated in FIG. 9.

Figure 10:
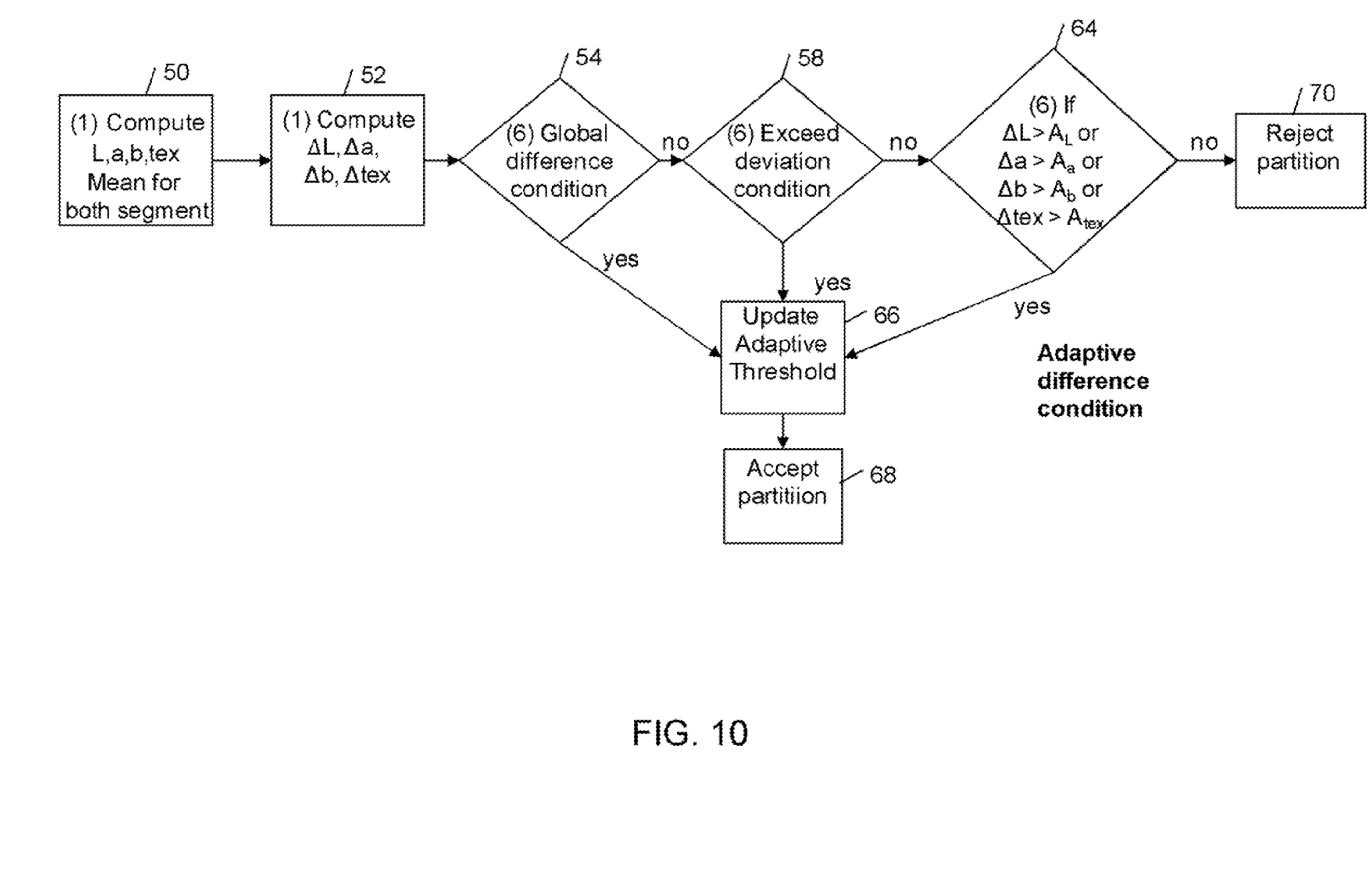
FIG. 10 shows an embodiment of a method of terminating embodiments of the hierarchical recursive segmentation method of FIG. 2.

FIG. 10 shows an embodiment of a method of terminating the hierarchical recursive partitioning in which the termination decision combination the termination condition of FIG. 8 with an additional adaptive threshold that allows additional cuts if they are above the differences that have been seen in earlier cuts. The adaptive threshold is initialized to the global threshold. It is updated at each recursion step. The adaptive threshold is useful for images that have small differences across the image (e.g., an image of a leopard in dry grass has low color differences).

In accordance with the method of FIG. 10, for each image region (referred to as a "segment" in FIG. 10) in a pair of image regions the mean of each color channel (e.g., L, A, B) and the mean texture ("tex") is computed (FIG. 10, block 50). The differences between the computed mean values for the two image regions are computed (FIG. 10, block 52). If any of the global difference conditions listed in block 54 are satisfied, the adaptive threshold is updated (FIG. 10, block 66) and the partition is accepted (FIG. 10, block 68); otherwise, if any of the deviation magnitude conditions listed in block 58 are satisfied, the adaptive threshold is updated (FIG. 10, block 66) and the partition is accepted (FIG. 10, block 68); otherwise, if any of the adaptive difference conditions listed in block 64 are satisfied, the adaptive threshold is updated (FIG. 10, block 66)

and the partition is accepted (FIG. 10, block 68); otherwise, the partition is rejected (FIG. 10, block 70). In this embodiment, the blocks 50, 52, 54, and 58 are the same as the corresponding blocks in FIG. 8. The parameters $A_L$, $A_a$, $A_b$ are empirically determined adaptive difference threshold values for the differences in the CIELAB color space, and the parameter $A_{tex}$ is an empirically determined adaptive difference texture difference threshold value.

Figure 11:
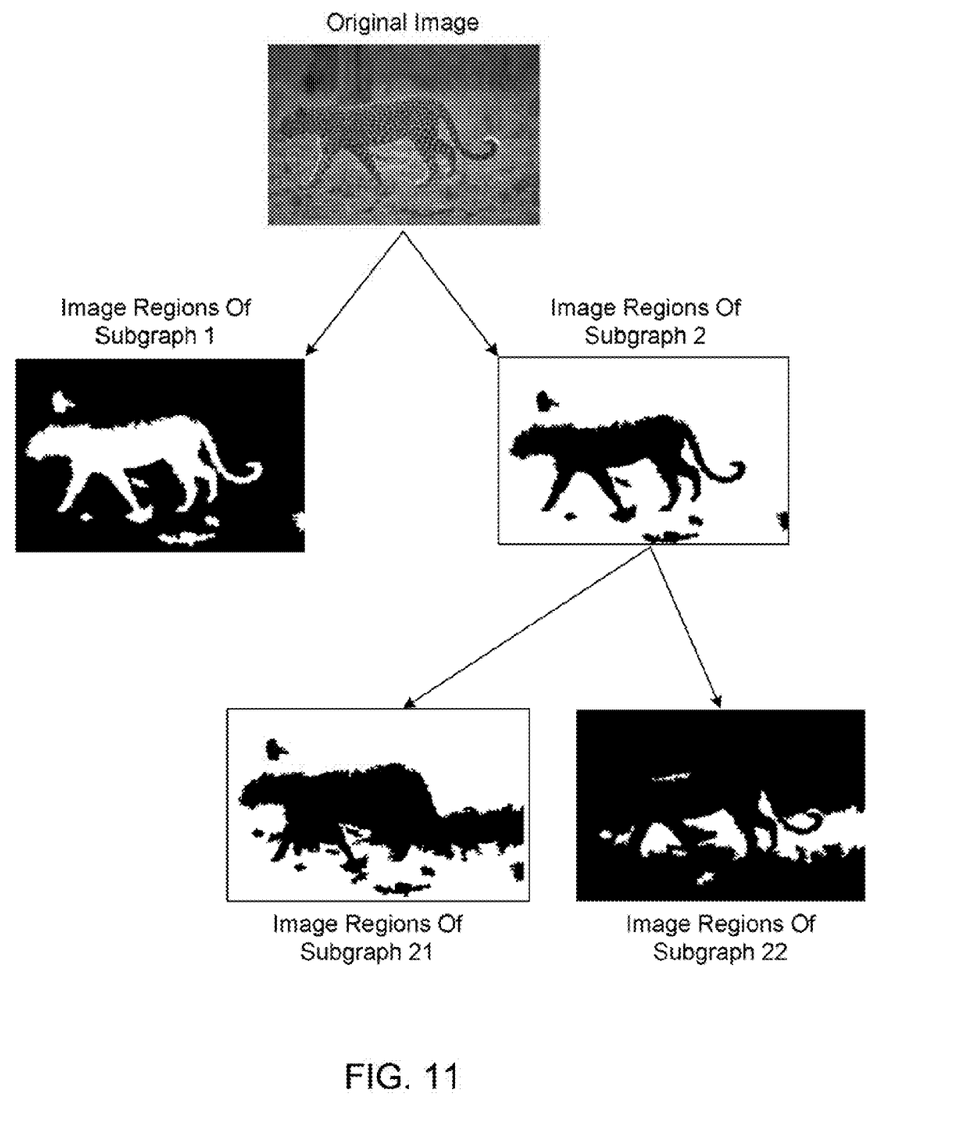
FIG. 11 shows an exemplary segmentation map of two partitions of an image that are accepted by the termination method of FIG. 10.

An exemplary segmentation map of two partitions that are accepted by the termination method of FIG. 10 is illustrated in FIG. 11. It is interesting to note that the second partition is accepted although the differences in color are smaller than the global thresholds, due to the adaptive thresholds that were set following the first partition. Although the color differences are small, they are significant in this image.

Other embodiments may include additional termination predicates that handle some special cases for very large and very small cut regions, including one or more of the following termination predicates:

1. The thresholds are reduced for very large regions in order increase the likelihood of accepting the partition and avoiding missing an object that may be hidden in a highly textured area.
2. With respect to very large regions, if there are large gradients at the cut border, then the partition is accepted.
3. With respect to unbalanced partitions (which indicates a foreground/background cut), if the region surrounding the smaller segment is very different from the segment, then the partition is accepted. Very small, especially uneven cuts, where one region is much smaller than the other, often imply a small, but important object; this object may be similar to the overall region in color, but disconnected and very different from its surrounding area.

An exemplary embodiment of a process of terminating the hierarchical recursive partitioning based on multiple heuristic termination predicates is described in the attached Appendix. In this description, the numbered process steps 1 and 6 correspond to the blocks 50, 52, 54, 58, and 64 in the methods of FIGS. 8 and 10 that are labeled (1) and (6), respectively. Although the algorithm is described on the pixel data, it is actually possible to compute the measures using the feature values of the segments of the initial segmentation, which were computed earlier to build the segment graph.

V. EXEMPLARY OPERATING ENVIRONMENTS

Embodiments of the image segmentation system 10 may be implemented by one or more discrete modules (or data processing components) that are not limited to any particular hardware, firmware, or software configuration. In the illustrated embodiments, the modules may be implemented in any computing or data processing environment, including in digital electronic circuitry (e.g., an application-specific integrated circuit, such as a digital signal processor (DSP)) or in computer hardware, firmware, device driver, or software. In some embodiments, the functionalities of the modules are combined into a single data processing component. In some embodiments, the respective functionalities of each of one or more of the modules are performed by a respective set of multiple data processing components.

In some implementations, process instructions (e.g., machine-readable code, such as computer software) for implementing the methods that are executed by the embodiments of the image segmentation system 10, as well as the data it generates, are stored in one or more machine-readable media. Storage devices suitable for tangibly embodying these instructions and data include all forms of non-volatile computer-readable memory, including, for example, semiconductor memory devices, such as EPROM, EEPROM, and flash memory devices, magnetic disks such as internal hard disks and removable hard disks, magneto-optical disks, DVD-ROM/RAM, and CD-ROM/RAM.

In general, embodiments of the image segmentation system 10 may be implemented in any one of a wide variety of electronic devices, including desktop and workstation computers, digital still image cameras, digital video cameras, printers, scanners, and portable electronic devices (e.g., mobile phones, laptop and notebook computers, and personal digital assistants).

Figure 12:
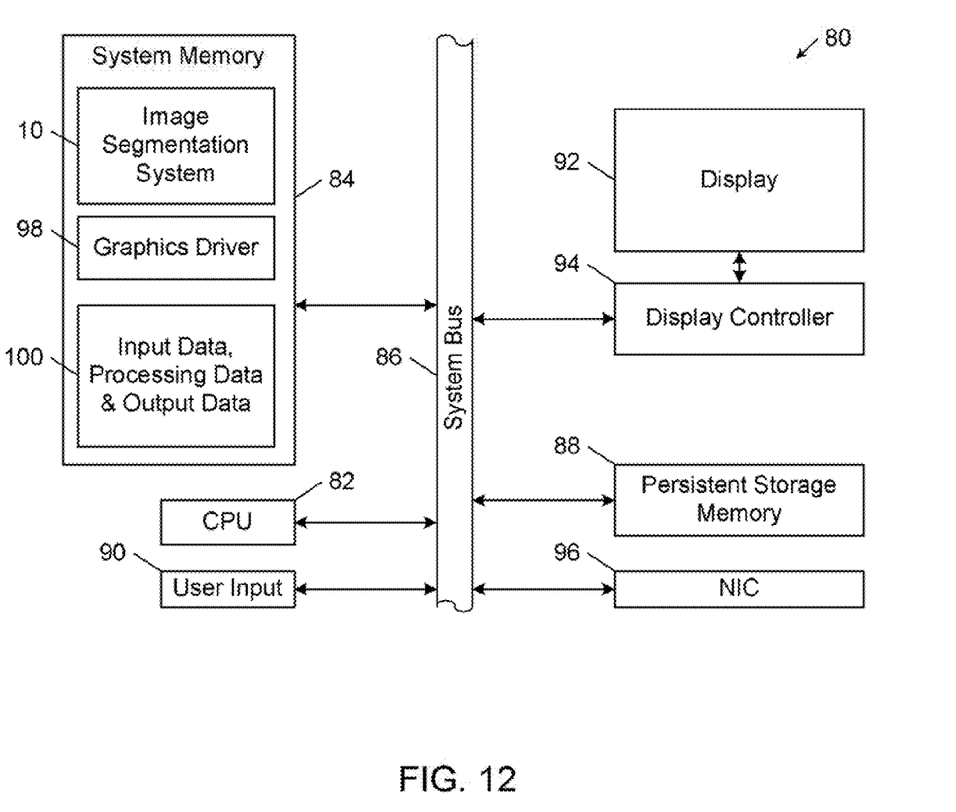
FIG. 12 is a block diagram of an embodiment of a computer system that incorporates an embodiment of the image segmentation system of FIG. 1.

FIG. 12 shows an embodiment of a computer system 80 that incorporates any of the embodiments of the image segmentation system 10 described herein. The computer system 80 includes a processing unit 82 (CPU), a system memory 84, and a system bus 86 that couples processing unit 82 to the various components of the computer system 80. The processing unit 82 typically includes one or more processors, each of which may be in the form of any one of various commercially available processors. The system memory 84 typically includes a read only memory (ROM) that stores a basic input/output system (BIOS) that contains start-up routines for the computer system 80 and a random access memory (RAM). The system bus 66 may be a memory bus, a peripheral bus or a local bus, and may be compatible with any of a variety of bus protocols, including PCI, VESA, Microchannel, ISA, and EISA. The computer system 60 also includes a persistent storage memory 88 (e.g., a hard drive, a floppy drive, a CD ROM drive, magnetic tape drives, flash memory devices, and digital video disks) that is connected to the system bus 86 and contains one or more computer-readable media disks that provide non-volatile or persistent storage for data, data structures and computer-executable instructions.

A user may interact (e.g., enter commands or data) with the computer 80 using one or more input devices 90 (e.g., a keyboard, a computer mouse, a microphone, joystick, and touch pad). Information may be presented through a graphical user interface (GUI) that is displayed to the user on a display monitor 92, which is controlled by a display controller 94. The computer system 80 also typically includes peripheral output devices, such as speakers and a printer. One or more remote computers may be connected to the computer system 80 through a network interface card (NIC) 96.

As shown in FIG. 12, the system memory 84 also stores the image segmentation system 10, a GUI driver 98, and a database 100 containing image files corresponding to the image 16, the segmentation data 18, other input data, intermediate processing data, and output data. In some embodiments, the image segmentation system 10 interfaces with the GUI driver 98 and the user input 90 to control the creation of the segmentation data 18. In some embodiments, the computer system 80 additionally includes a graphics application program that is configured to render image data on the display monitor 92 and to perform various image processing operations on the image 16 and visualizations of the segmentation data 18.

VI. CONCLUSION

The embodiments that are described herein provide apparatus and methods that are capable of automatically segmenting images for different applications in ways that require minimal or no manual intervention. These embodiments are tunable for different applications by respective sets of parameters and termination predicates. This allows these embodiments to be readily adaptable to different applications with minimal or no manual intervention. Once an embodiment is tuned for an particular application, the segmentation of image for the particular application typically is fully automatic.

Other embodiments are within the scope of the claims.

APPENDIX

This Appendix describes an exemplary embodiment of a process of terminating the hierarchical recursive partitioning based on multiple heuristic termination predicates.

| AcceptCut | |
|---|---|
| Inputs: | imgL the luminance channel |
| | imgA the A channel |
| | imgB the B channel |
| | imgTex the color entropy texture measure |
| | imgGrad the gradient image |
| | map1 the map of one region of the cut |
| | map2 the map of the other region of the cut |
| | inThresh an adaptive threshold value for the L, A, B and Tex features |
| | maxThreshan absolute threshold value for the L, A, B and Tex features |
| | depth recursion depth |
| Outputs: | flag accept or reject the cut |
| | outThreshUpdated adaptive threshold |

1. Compute color differences
   delL = abs(mean(imgL(map1))−mean(imgL(map2)))
   delA = abs(mean(imgA(map1))−mean(imgA(map2)))
   delB = abs(mean(imgB(map1))−mean(imgB(map2)))
   delT = abs(mean(imgTex(map1))−mean(imgTex(map2)))
2. Compute dilated edge maps of each cut region
   edges1 = dilate(edge(map1))
   edges2 = dilate(edge(map2))
3. Compute the color deviation of the uncut region
   devL = std(imgL(map1 OR map2 OR edges1 OR edges2))
   devA = std(imgA(map1 OR map2 OR edges1 OR edges2))
   devB = std(imgB(map1 OR map2 OR edges1 OR edges2))
4. Set foreground flag.
   if size(map1)/10 > size(map2) OR size(map2)/10 > size(map1)
      foregroundCase = 1;
   else
      foregroundCase = 0;
5. If depth == 1 then flag = 1
   Set outThresh = [delL, delA, delB, delT]
6. if min(size(map1),size(map2)) > nPixels/50 ; Large region so we are more likely to take the cut
   If any([delL, delA,delB, delT] > inThresh) then flag = 1
   If any([delL, delA,delB, delT] > maxThresh) then
   flag = 1
   If any([delL, delA,delB, delT] > [devL, devA, devB]) then
   flag = 1
   elseIf any([delL, delA,delB, delT] > inThresh) then flag = 1
7. if not(foregroundCase) AND size(map1)+size(map2) > nPixels/9 ; Special case for very large regions
   if (max(mean(imgGrad(edges1)), mean(imgGrad(edges2))) >
         2*min(mean(imgGrad(map1)),mean(imgGrad(map2)))); Large gradients at cut border -use reduced thresholds
   If any([delL, delA,delB, delT] > inThresh/2) then flag = 1
   If any([delL, delA,delB, delT] > maxThresh/2) then flag = 1
8. if foregroundCase AND flag ; A small feature may be very different from surrounding area
   Compute color differences between the area around the smaller region and the other region
      mapSurround = dilate(mapSmall)−mapSmall delL2 =
         abs(mean(imgL(mapLarge))−mean(imgL(mapSurround)))
      delA2 = abs(mean(imgA(mapLarge))−mean(imgA(mapSurround)))
      delB2 = abs(mean(imgB(mapLarge))−mean(imgB(mapSurround)))
      delT2 =
      abs(mean(imgTex(mapLarge))−mean(imgTex(mapSurround)))
      If any([delL2, delA2,delB2, delT2] > inThresh) then flag = 1
      If any([delL2, delA2,delB2,delT2] > maxThresh) then flag = 1
9. Update adaptive threshold
   outThresh = max([delL, delA, delB, delT], inThresh)

The invention claimed is:

1. A method, comprising:
   segmenting an image into image regions;
   representing each of the image regions by a respective vertex and a respective feature vector of features characterizing the image region;
   building a graph of the vertices interconnected by edges each of which has a respective edge weight value that depends on a distance between the respective feature vectors of the image regions interconnected by the edge;
   partitioning the graph into respective disjoint subgraphs based on the edge weight values;
   repeating the partitioning of one or more of the subgraphs into respective subgraphs; and
   producing a partition tree data structure that describes a partitioning hierarchy of parent-child relationships between the subgraphs;
   wherein the segmenting, the representing, the building, the partitioning, the repeating, and the producing are performed by a computer.

2. The method of claim 1, wherein the repeating comprises evaluating each of the subgraphs against a termination predicate, and recursively repeating the partitioning of each of the subgraphs that fails to satisfy the termination predicate.

3. The method of claim 1, further comprising:
   associating respective ones of the subgraphs with a respective unique label; and
   assigning to each of the image regions all the respective unique labels associated with the subgraphs comprising the respective vertex representing the image region.

4. The method of claim 3, wherein each of the subgraphs that is partitioned from a respective other one of the subgraphs is a child of the respective other subgraph and the respective other subgraph is a parent of each of the subgraphs partitioned therefrom; and wherein the associating comprises associating only the subgraphs in the partitioning hierarchy that have zero child subgraphs with a respective unique label.

5. The method of claim 3, wherein the associating comprises associating each of the subgraphs in the partitioning hierarchy with a respective unique label.

6. The method of claim 5, further comprising generating a segmentation map that labels pixels in each of the image regions with respective ones of the unique labels that are associated with the subgraphs comprising the respective vertex representing the image region, wherein for each of the pixels the respective unique labels are ordered in accordance with portioning levels of the corresponding subgraphs in the partitioning hierarchy.

7. The method of claim 3, further comprising generating a segmentation map of the image based on the labels assigned to the image regions.

8. The method of claim 7, wherein the segmentation map labels pixels in the image with the labels assigned to the corresponding image regions.

9. The method of claim 1, further comprising selecting a sub-portion the partition tree data structure representing the graph down to a selected partitioning level in the partitioning hierarchy.

10. The method of claim 9, further comprising generating a segmentation map of the image based on the associations between the respective vertices representing the image regions and the respective subgraphs in the selected portion of the partition tree data structure.

11. The method of claim 1, wherein the image comprises pixels, and the building comprises:
   for each of the pixels determining a respective feature vector of one or more feature values;

for each of the vertices ascertaining a respective aggregate feature vector from the respective feature vectors of the respective pixels contained by the image region corresponding to the vertex; and for each of the edges calculating the respective edge weight from the respective feature vectors of the respective vertices interconnected by the respective edge.

12. The method of claim 11, wherein the ascertaining comprises for each of the vertices ascertaining the respective aggregate feature vector from an average of the feature vectors of all the respective pixels contained by the image region corresponding to the vertex.

13. The method of claim 11, wherein the calculating comprises for each of the edges determining a respective distance metric value from the respective feature vectors of the respective vertices interconnected by the respective edge, and determining the respective edge weight from the respective distance value.

14. The method of claim 13, wherein the determining of the respective distance metric values comprises:

for each of the respective feature vectors of the respective vertices determining a respective covariance matrix of covariance values between the features values of the respective feature vector;

determining a summary covariance matrix summarizing a distribution of the covariance matrices; and for each of the edges determining the respective distance metric value from the respective feature vectors of the respective vertices interconnected by the respective edge and the summary covariance matrix.

15. The method of claim 14, wherein for each of the edges interconnecting vertices i and j the calculating the respective edge weight $\alpha_{ij}$ comprises evaluating:

$$\alpha_{ij} = e^{-\frac{d_{ij}^2}{\sigma}}$$

wherein $d_{ij}^2$ is the respective distance metric between feature vectors $\vec{f}_i$ and $\vec{f}_j$ given by $d_{ij}^2 = (\vec{f}_i - \vec{f}_j)^T W (\vec{f}_i - \vec{f}_j)$, W is the summary covariance matrix, and $\sigma$ is a scaling parameter.

16. The method of claim 11, wherein for each of the pixels the determining of the respective feature vector of one or more feature values comprises determining a respective one of the feature values from a probability value indicating a degree to which the pixel corresponds to predetermined perceptual color class from color values associated with the pixel.

17. Apparatus, comprising:
a computer-readable medium storing computer-readable instructions; and
a data processor coupled to the computer-readable medium, operable to execute the instructions, and based at least in part on the execution of the instructions operable to perform operations comprising
segmenting an image into image regions;
representing each of the image regions by a respective vertex and a respective feature vector of features characterizing the image region;
building a graph of the vertices interconnected by edges each of which has a respective edge weight value that depends on a distance between the respective feature vectors of the image regions interconnected by the edge;
partitioning the graph into respective disjoint subgraphs based on the edge weight values;
repeating the partitioning of one or more of the subgraphs into respective subgraphs; and
producing a partition tree data structure that describes a partitioning hierarchy of parent-child relationships between the subgraphs.

18. The apparatus of claim 17, wherein in the repeating the data processor is operable to perform operations comprising evaluating each of the subgraphs against a termination predicate, and recursively repeating the partitioning of each of the subgraphs that fails to satisfy the termination predicate.

19. At least one non-transitory computer-readable medium having computer-readable program code embodied therein, the computer-readable program code adapted to be executed by a computer to implement a method comprising:
segmenting an image into image regions;
representing each of the image regions by a respective vertex and a respective feature vector of features characterizing the image region;
building a graph of the vertices interconnected by edges each of which has a respective edge weight value that depends on a distance between the respective feature vectors of the image regions interconnected by the edge;
partitioning the graph into respective disjoint subgraphs based on the edge weight values;
repeating the partitioning of one or more of the subgraphs into respective subgraphs; and
producing a partition tree data structure that describes a partitioning hierarchy of parent-child relationships between the subgraphs.

20. The at least one non-transitory computer-readable medium of claim 19, wherein the repeating comprises evaluating each of the subgraphs against a termination predicate, and recursively repeating the partitioning of each of the subgraphs that fails to satisfy the termination predicate.

* * * * *